Dec. 26, 1950     F. BONCOMPAIN     2,535,720
AUTOMATICALLY CONTROLLED PLANT THINNING
AND CULTIVATING MACHINE
Filed Aug. 27, 1946     5 Sheets-Sheet 3

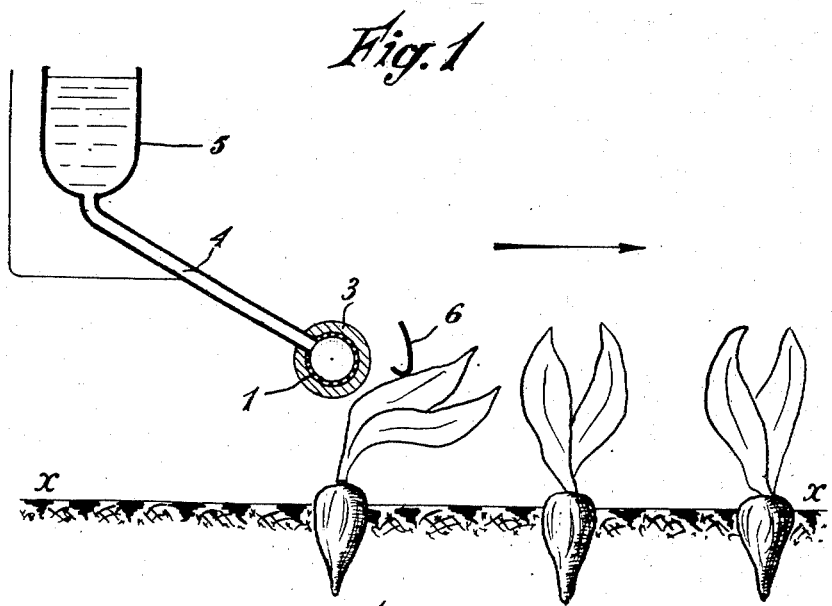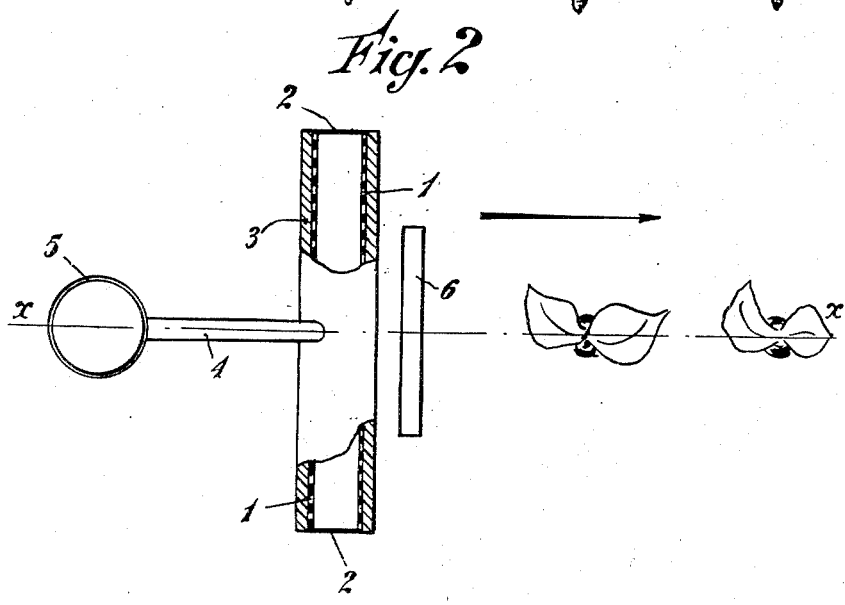

FRANÇOIS BONCOMPAIN
INVENTOR

By: Stevens and Davis
ATTORNEYS

Dec. 26, 1950   F. BONCOMPAIN   2,535,720
AUTOMATICALLY CONTROLLED PLANT THINNING
AND CULTIVATING MACHINE
Filed Aug. 27, 1946   5 Sheets-Sheet 4

François Boncompain
Inventor
By: Stevens and Davis
Attorneys

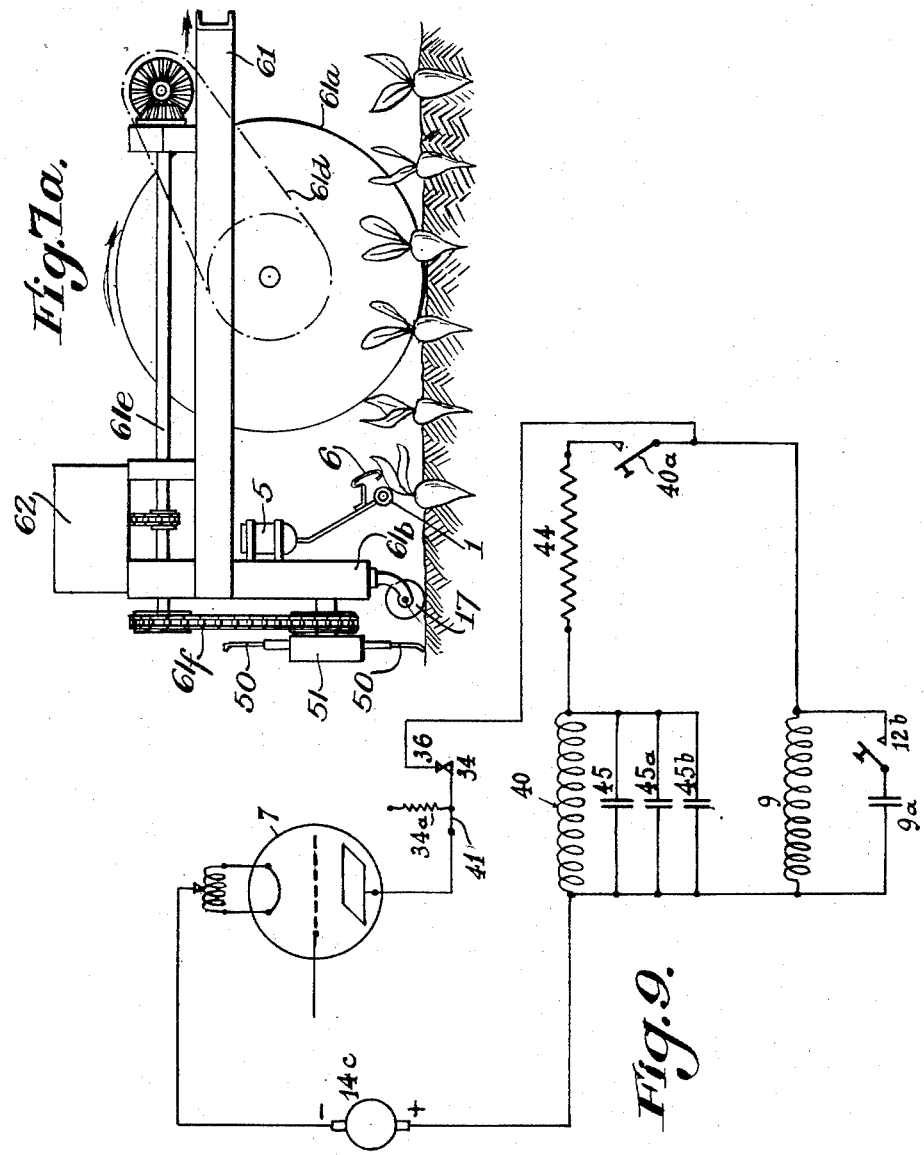

Patented Dec. 26, 1950

2,535,720

UNITED STATES PATENT OFFICE 2,535,720

AUTOMATICALLY CONTROLLED PLANT THINNING AND CULTIVATING MACHINE

François Boncompain, Saint-Ouen, France, assignor to André Marie Auguste Ferté, Terny par Margival, France Application August 27, 1946, Serial No. 693,364
In France July 26, 1945

Section 1, Public Law 690, August 8, 1946
Patent expires July 26, 1965

11 Claims. (Cl. 97—15)

By invention has for its object a thinning and cultivating machine of the type including retractable tools adapted to be automatically set in their operative position for digging the ground and uprooting the plants therein or else for raising or retracting said tools in order to preserve certain plants. Such machines are of particular interest, for the cultivation of beetroots and the like plants sown in rows.

My invention has for its object a machine of this type wherein the member controlling the plants to be uprooted or else to be protected, is constituted by a feeler which when entering into contact with the plant closes a circuit provided with a suitable amplifier controlling a relay capable of producing the retracting or raising movement of the operating tools; said machines include moreover means for automatically rendering said circuit inoperative after it has operated once for protecting a plant so that the following plants may be removed over a predetermined interval. Such a machine allows executing automatically the selection or thinning out of the young plants which is of particular interesnt i the cultivation of plants sown in rows such for instance as beetroots which grow extremely thick and of which a number should be removed for allowing the remaining plants sufficient room for their growth. The means considered may be electro-mechanical and include a relay which is actuated during the passage of a feeler over the first plant and starts the drive of a cam which provides after a certain travel the opening of the circuit controlling the retraction of the tool.

The following description and accompanying drawings given out by way of example and by no means in a limitative manner will allow the manner of executing the invention to be well understood.

In said drawings:

Fig. 1 is an elevational view of a feeler adapted to close the control circuit when it enters into contact with a plant.

Fig. 2 is a part sectional plan view thereof.

Fig. 7a is a diagrammatic side elevation view of a machine according to the invention.

Fig. 9 shows a modification of the wiring diagram ensuring the delayed breaking of the control circuit.

Figure 3:
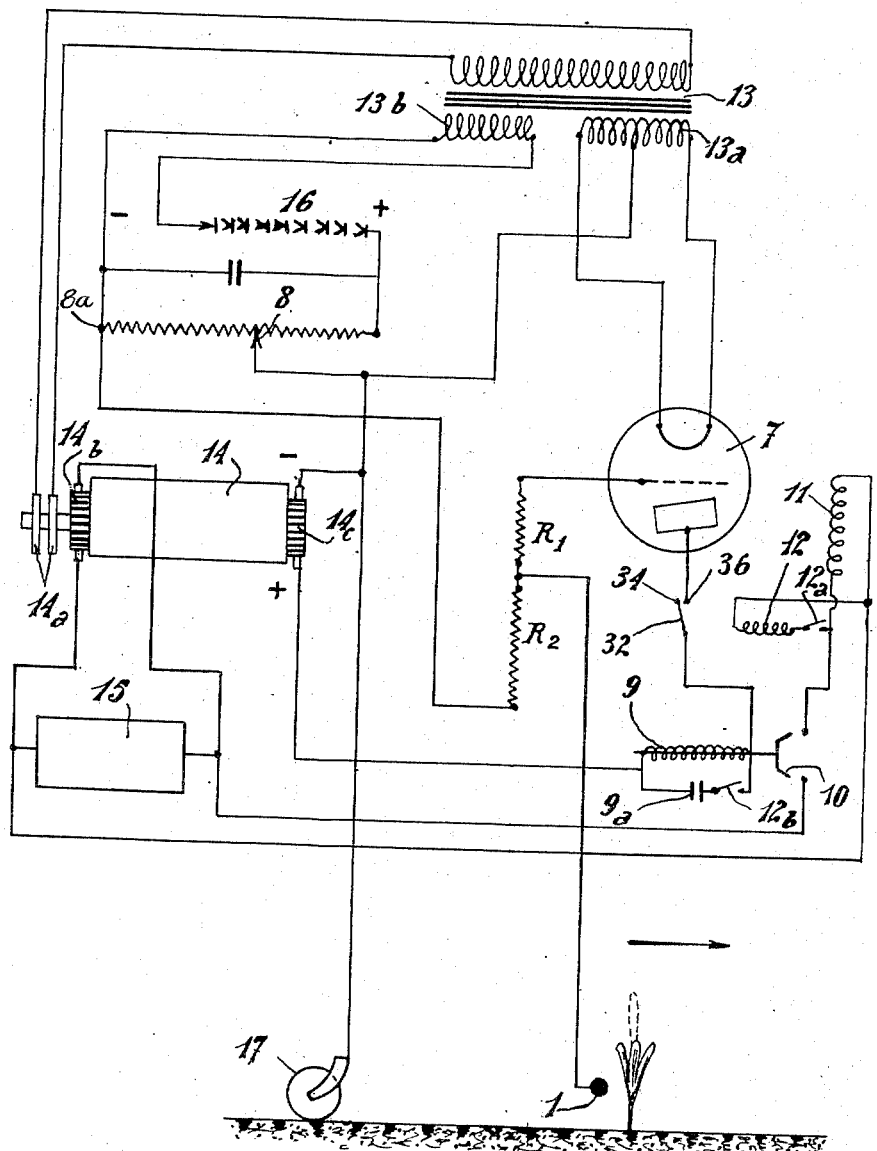
Fig. 3 is a wiring diagram of the machine.

Referring to Figs. 1, 2 and 7a, the machine comprises a frame 61 adapted to be hooked to any tractive means and which is supported by two wheels 61a. The rear portion of this frame 61b supports the rotary drum 51 provided with tools 50. The drum 51 is driven in rotary fashion by any suitable means, for example by the wheels 61a of the machine, with the aid of chain 61d, shaft 61e, and chain 61f. Beneath the machine, forwardly of the drum 51 is the electrical feeler 1, carried by the frame 61 and constantly moistened by water contained in the tank 5. The roller 17 is likewise carried by the chassis, said roller serving to close the control circuit of the amplifier through the plant contacted by the feeler 1, and the soil. The machine includes a contact member or feeler constituted by a perforated metal tube 1, closed at both ends and covered at its periphery with a coat 3 formed of a capillary material such as an agglomeration of fibers similar to that forming lamp wicks. The feeler thus constituted by the system of the tube and wick shaped coat therefor, is secured horizontally to the frame 61 of the machine, which moves on the ground in the direction of the arrow marked in Figs. 1, 2 and 7a.. The tube 1 is preferably connected through its medial part to a second tube 4 leading to a reservoir 5 under load secured to the frame 61. This reservoir 5 is filled with water or another electrolyte whereby the wick 3 forming the outer surface of the feeler is constantly kept moist. This wick is adapted to come into contact with the plants and to this end the tube and the wick are secured to the machine at a suitable level above ground so that the middle of the tube 1 may coincide substantially in horizontal projection (Fig. 2) with the row of plants X—X which is to be operated upon by the machine.

To the front of the feeler in the direction of operation of the machine and at a suitable height is arranged a screen 6 of insulating material which serves to lay the plants down before the wick 3 comes into contact therewith so that the contact between the bent plant and the machine may be obtained as far as possible on the vertical passing through the foot of the plant; thus the contact may be produced at a distance from the operating tools 50 which is accurately defined and which is equal in the case considered to the interval separating the feeler from the tool system, the feeler moving with the machine in the direction of the arrow along and above the row of plants X—X. In Fig. 1, a plant is moreover shown as folded or laid down by the screen 6 and the contact may be obtained in this case between the plant and the feeler above the foot of the plant. The electric control circuit may be arranged in a casing 62 on the frame of the machine. As illustrated in Fig. 3, it includes an amplifier consisting of a thyratron 7 the biasing of the control grid of which is controlled by the feeler 1 of the type described hereinabove, through the agency of the resistance R2. The grid circuit of the thyratron is closed through the potentiometer 8 which serves also for giving a negative biasing to the grid as disclosed hereinbelow. The anodic circuit includes the electromagnet 9 controlling the switch 10. This switch controls a second relay 11 which when energized produces the retraction of a number of the tools 50 and the same switch 10 also controls a further relay 12 when the hand-controlled switch 12a is closed, as explained below. The action of the relay 12 is to break the anode circuit after a certain delay as will be disclosed hereinafter. The cathode is heated by the alternating current taken off one of the secondaries 13a of a transformer 13 the primary of which receives the alternating current collected from the rings 14a of a motor-generator 14 provided with commutators. The driving part of said motor-generator receives through the commutator 14b the driving current from a storage battery 15 provided on the agricultural machine. This storage battery is also used for energizing the relays 11 and 12 when the switch 10 is closed. Through a second collector 14c the motor-generator 14 feeds direct current under a suitable voltage into the anode circuit of the thyratron 7. The second secondary 13b of the transformer 13 produces through the agency of the dry rectifier 16 and of the potentiometer 8 an adjustable voltage which serves for biasing the grid of the thyratron with reference to the cathode.

Figure 8:
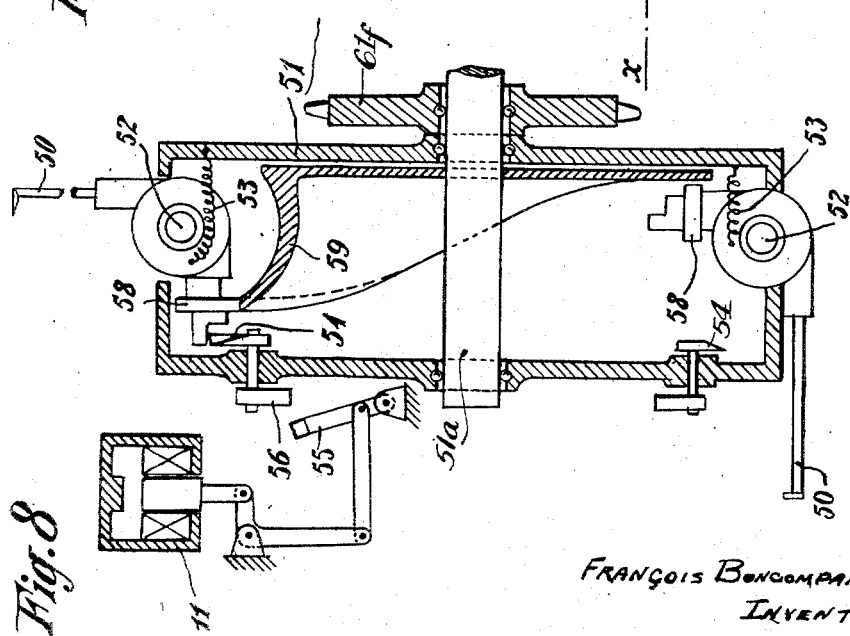
Fig. 8 is a diagrammatic cross-sectional view of a known arrangement ensuring the retraction of the operating tools.

Supposing first the hand operated switch 12a is open whereby the relay 12 is de-energized, the switch 34—36 is closed and the switch 12b leading to the anode is also closed, the operation of the machine is as follows:

When the feeler 1 is not in contact with any plant, it is apparent from inspection of the drawing that the grid is brought by the potentiometer 8 and through the resistance R1 and R2 to a negative potential with reference to the cathode. This potential is adjusted through displacement of the slider of the potentiometer 8 to a value underneath the critical value which corresponds to the voltage applied between anode and cathode whereby no discharge may pass through the thyratron. The tools 50 of the machine are thus allowed to work in the ground. When the feeler 1 touches a plant to be respected, such as a beet root if the machine is used for operating on beet root lines, the slider of the potentiometer 8 is connected through the small wheel 17 (forming a ground connection), the ground, the plant and the feeler 1 with the connecting point between the resistances R1—R2. A small electric current flows in the circuit comprising the point 8, wheel 17, the ground, the plant, the feeler 1, the resistance R2 and the point 8a. This current is amplified by the thyratron 7, because the potential of the grid of the thyratron becoming less negative, the discharge passes instantaneously, in the anode circuit of said thyratron. The relay 9 is thus energized, its contact 10 closes and the relay 11 energized in its turn controls the retraction or the raising of the tool so as to preserve the plant touched by the feeler. Relay control devices as shown at 11, are known which allow retracting the operative tools when said relay is energized. The operative tools may be constituted for instance by the arms 50 (Fig. 8) arranged after the manner of spokes at the periphery of a drum 51 the axis of which is parallel to the axis of the machine and which is rotatingly driven by the machine itself around the stationary shaft 51a, secured to the frame of the machine, when the latter moves over the ground. These arms are pivotally secured at 52 to the drum and are submitted to the action of springs 53 which urge them into a folded position for which they lie parallel to the axis of the drum and in this retracted position they do not work in the ground as illustrated for the tool 50 at the lower part of the drum of Fig. 8. A latching system 54 associated with each tool ensures in opposition to the spring 53 the radial location of the corresponding tool. A movable abutment 55 controlled by the armature of the relay 11 is located in the path of the projections 56 rigid with the latch 54 when the relay is energized and produces thus through actuation of said projections the pivoting of the latch 54 and the release of the corresponding tools. The latter are retracted by the springs 53 when during the rotation of the drum the rollers 58 carried by the tool support and rolling over a stationary cam 59 (secured to the stationary shaft 51a) arrive on to the lower part of this cam and are allowed to rock while the upper part of said cam returns the tools into their projecting operative position inside which they are locked by the latch 54 if the electromagnet 11 is deenergized. The number of retracted tools depends obviously on the arc described by the drum 51 while the stop 55 is held back by the relay 11 i. e. during the duration of energization of said relay or during the time of contact of the feeler 1 with the plant or plants to be preserved.

Arrangements of this type are known per se, and it is not necessary to describe them to any further length.

It is important that as soon as the contact between the feeler 1 and the plant has ceased that the discharge in the thyratron may be extinguished. It is known that once a thyratron is energized by a suitable biasing of the grid it remains in said energized state until the anode current passes through zero. Therefore, if the source of energy inserted in the anode circuit of a thyratron is a source of direct current as in the case illustrated in Fig. 3, the discharge once initiated is no longer stopped whatever may be the biasing impressed on the grid. In the circuit illustrated in Fig. 3, the voltage taken off the commutator 14c of the motor-generator 14 is transformed into a pulsatory voltage through the following arrangement; there is arranged in parallel with the winding of the relay 9 a condenser 9a, the circuit of which can be closed by a switch 12b. The self induction of the electro-magnet 9 and the capacity of the condenser 9a are selected so as to form together an oscillating circuit of high frequency say 1,000 periods per second for instance. The voltage impressed on the anode of the thyratron with reference to the cathode passes thus from a maximum to zero at the frequency of said oscillating circuit. Consequently as soon as the biasing of the grid which has initiated the discharge is removed, the thyratron ceases discharging as soon as the anode voltage passes through its following zero i. e. after a time which may be as reduced as desired and depends only on the frequency of the oscillating circuit 9—9a.

Obviously, it is necessary for the distance between the feeler and the plane in which the tools operate to be adjusted in conformity with the angle of rotation of the drum 51 corresponding to the time elapsed between the moment at which the tool receives its retracting movement from the relay 11 and that at which it passes in its cooperating position with reference to the ground for which it would engage the ground if it were not retracted so that the plant in contact with the feeler and already behind same may be protected against any possible action of the tool when the latter comes into register with said plant.

The machine designed as disclosed and used with a row of spaced plants, has its tools retracted each time they arrive into register with one of the plants to be respected and it is on the contrary rendered operative between said plants whereby the ground may be worked inside such intervals.

Figure 7:
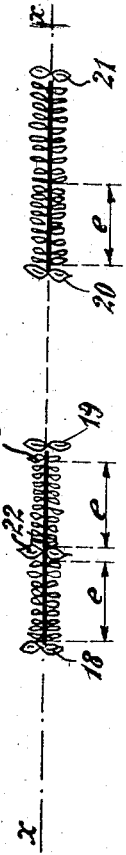
Fig. 7 is a view in horizontal diagrammatic cross-section of a row of plants adapted to illustrate the operation of the machine.

But there is another problem which arises when the plants sown in rows grow in thick formation and this problem consists in removing some of these plants while allowing the growth of the remaining plants. This is the usual operation of thinning executed in beetroot growing and known in France under the name of "demariage." A row of beetroots, to be thus thinned out, appears generally as shown in Fig. 7. There exists at 18 a first plant followed up to 19 by a number of plants growing very near one another. From 19 to 20 there are no plants at all, by reason of a faulty germination. At 20 there is a further plant beginning a further row of thickly growing plants up to 21 and so on. It is necessary that when the machine arrives in register above the plant 18 said plant may be preserved while the following plants should be removed through a distance $e$, the plant following said distance at 22 is preserved the following plants are removed over a further distance $e$ and the plant 23 at the end of said distance is preserved; the following plants are again removed, the plant standing at 20 at the beginning of the second plant row 20—21 is preserved, the plants being removed again through a distance $e$ and so on.

Figure 4:
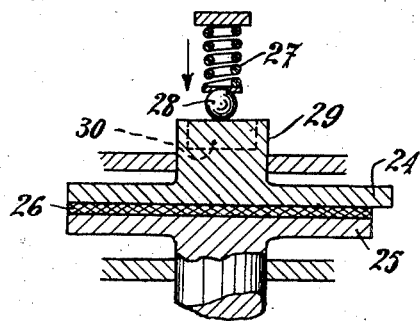
Figs. 4 and 5 are views projected on two perpendicular planes of the driving means providing for the delayed breaking of the control circuit.
Figure 5:
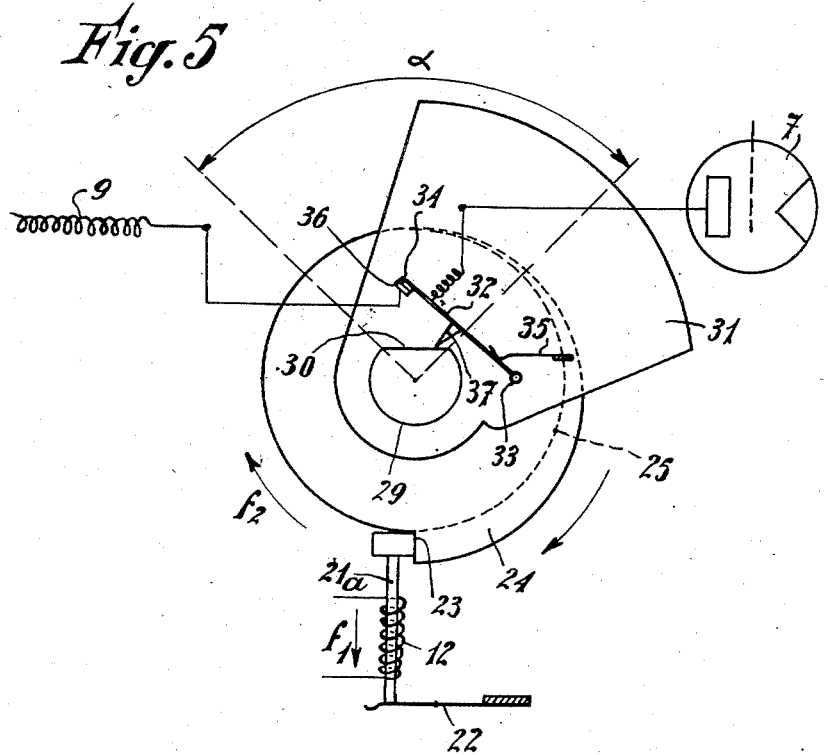

The problem thus laid open is solved by the action of the relay 12 which in accordance with the precedingly described manner of operating has been supposed to be inoperative by reason of the opening of the hand-controlled switch 12a. When this switch 12a is closed, the relay 12 is energized together with the relay 11 as soon as the feeler 1 meets the first plant of the row, say plant 18. Moreover, in this manner of operation, the switch 12b in series with the condenser 9a is opened whereby the action of the oscillating circuit 9—9a is cut off and the discharge through the thyratron is no longer extinguished once it has been initiated by the feeler 1. As soon as it is energized, the relay 12 displaces its armature 21a (Fig. 5) in the direction of the arrow $f_1$ in opposition to the action of the spring blade 22. This armature moves consequently out of the notch 23 provided in a rotary plate 24 which allows said plate to be driven into rotation by the cooperating plate 25 constantly driven by the machine in the direction $f_2$. (The device shown in Figs. 4 and 5 may be arranged in the casing 62 secured on the machine and the plate 25 actuated by a suitable transmission with chain 33a, for example, as indicated in Fig. 7a.) A friction disc 26 of agglomerated cork felt or the like material is inserted for this purpose between the plates 24 and 25 and a spring 27 urges the plate 24 against the disc 26 and the plate 25 through the agency of a ball 28 (Fig. 4). An extension 29 arranged axially of the plate 24 shows a flat side surface 30. A stationary sector 31 adapted to be angularly set in the desired position round the common axis of the plates carries a tongue 32 pivotally secured round a pivot 33 and provided at its free end with a movable contact piece 34. A spring 35 urges constantly said movable contact 34 against the stationary contact piece 36 rigid with the sector 31. The movable contact 34 and the stationary contact 36 are inserted inside the anode circuit of the thyratron 7. The tongue 32 carries moreover a projection 37 bearing against the axial projection 29 of the plate 24 under the action of the spring 35, said projection 37 being such that at the start, when the plate 24 is locked by the armature 21 of the relay 12 engaging the notch 23, the contacts of the switch 34—36 may be urged against one another so as to close the anode circuit of the thyratron. The flat surface 30 allows such a closing of the contacts and when the plate 24 rotates, said closing is maintained during the rotation through the angle $\alpha$ corresponding to the passage of the flat surface 30 in front of 37. On the contrary, beyond the rotary angle $\alpha$ and when the projection 37 begins bearing on the cylindrical part of the extension 29, the tongue 32 is raised in opposition to the action of the spring 35 and the contacts 34—36 move away from one another.

The operation of the arrangement is as follows:

When the first plant of a row such as the plant 18 is met by the feeler, the relay 12 energized as disclosed hereinabove at the same time as the relay 11, releases the plate 24 which is frictionally driven and begins rotating. At the same time, the relay 11 produces the retraction of a number of tools proportional to the time taken by the plate 24 to describe the angle $\alpha$ as during this time the discharge continues inside the thyratron. At the end of this time, the projection 37 on the tongue is raised by the cylindrical part of the projection 29 and the contacts 34—36 are moved apart. Consequently the discharge of the thyratron is extinguished and the relay 9 is de-energized and so are also the relays 11 and 12. While the projection 37 is urged outwardly by the cylindrical portion of the extension 29, the anode circuit remains open and the machine operates blindy i. e. all the tools dig the ground through the distance $e$. At the end of this distance, the plate 24 has described a complete revolution and is stopped by the abutment of the notch 23 against the armature 21 of the relay 12.

Figure 6:
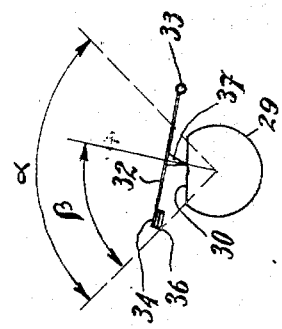
Fig. 6 illustrates the manner of adjusting said driving means.

It is possible to modify the number of tools retracted at the beginning of a distance $e$ either by angularly setting the sector 31 so that the projection 37 may assume at the start a position shown in Fig. 6 for which the operative angle is reduced to $\beta$ or else by replacing the plate 24 by another plate the flat surface of which shows an angle $\alpha$ of a different value. The distance $e$ between the plants or beetroots to be preserved i. e. the path to be executed during the blind operation of the machine may be adjusted by inserting, between the plate 25 and its driving means controlled by the machine, a suitable speed change gear.

The machine described allows thus:

Either digging between suitably spaced plants, the switch 12a, being open while the switch 12b is closed and the sector 31 is positioned so as to ensure the closing of the contact pieces 34—36;

Or else the thinning out of the thickly sown plants after closing of the switch 12a and opening of the switch 12b.

Fig. 9 shows a modification of the delaying means for said latter manner operating the machine. This modification is of a purely electric constitution and its parts may be incorporated to the switch board of the machine or tractor. An iron-cored relay 40 is adapted to attract its armature 41 which carries a movable contact 34 normally closing the circuit over the stationary contact piece 36 when inoperative and held in that position by a return spring 34a. A resistance 44 is inserted in series with the coil of said relay 40 and a condenser 45 is mounted in parallel with said coil.

If the thyratron 7 is energized through the action of the electrolytic feeler acting on the biasing of the grid, as described hereinabove, the current from the source 14c flows inside the two parallel circuits constituted on one hand by the relay 40 with its condenser 45 and its resistance 44 and on the other hand by the electromagnetic control means 9 for the tools.

Examining now the first of these circuits 40—44, 45, it is apparent that the current from the source 14c flows through the resistance 44 and the coil 40, which loads the condenser 45. This current decreases thus from a predetermined value up to the end of the charging of the condenser between the beginning and the end of the charging of the condenser the voltage at the terminals of the coil 40 will therefore increase from zero to a value which is that of the source 14c reduced by the amounts corresponding to the constant drop inside the thyratron and to the drop in the resistance 44. This value, at the end of the charging of the condenser, is sufficient for allowing the attraction of the armature carrying the contact 34. The opening of the switch 34—36 does away with the feed from the source but the armature returns into its inoperative position only after the condenser 45 has been sufficiently discharged into the inside of the coil 40. The switch 34—36 plays the same part as in the case of Fig. 3. The first stage elapsing between the beginning of the energization of the thyratron and the opening of the switch is used for the retraction of the tools because during this time the relay 9 is energized through the discharge; the second stage separating the failing of the contact 34 from the next closing of the switch under the action of the return spring, corresponds to the digging of the ground over a certain distance and to the removal of the plants filling up said distance.

For the adjustment of the apparatus shown in Fig. 9 four parameters are available, namely the ohmic resistance of 44, the capacity of the condenser 45 which is adjustable through the incorporation of the auxiliary condensers 45a— 45b, the length of the gap of the magnetic armature 41 of the relay and the stress exerted on said armature by the return spring.

It is therefore possible to obtain through suitable values of these parameters a correct timing of the operation as required for the work in view.

The circuits are completed by switches allowing as desired the operation of the machine for digging between separate plants or else for thinning out the plants. In the first case, the switch 12b is closed as in the case of Fig. 3 and the switch 40a is opened so as to energize the relay 40. In the second case on the contrary, the switch 12b is opened and the switch 40a is closed.

The storage battery described with reference to the preceding forms of execution may be omitted and all the electric members may be fed by a generator driven by the machine or its driving engine.

Obviously the above described forms of execution have been given out solely by way of examples and they may be modified in particular through the use of equivalent technical means without widening thereby the scope of my invention as defined in accompanying claims.

What I claim is:

1. An automatically controlled plant thinning and cultivating machine for digging selectively parts of a row of plants comprising a feeler of electrical conducting material adapted to engage the plants of a row, a source of electricity, an electric circuit connected to said source and to said feeler and adapted to be closed by the grounding of the feeler through a plant, an amplifier connected to said circuit, a relay the energization of which is controlled by said amplifier, digging tools adapted to be moved into inoperative position by said relay when energized and timing means for automatically deenergizing during a predetermined time said relay after the circuit has been closed over a plant to be protected against the action of the tools.

2. A machine as claimed in claim 1 in which the feeler is constituted by a metallic support and an outer lining of porous material thereon moistened with electrolyte.

3. A machine as claimed in claim 1 in which the timing means includes a second relay controlled by the amplifier, an armature therefor, a rotary cam adapted to be released by the attraction of the armature by the second relay, means driving the cam and means whereby the cam after a predetermined angular travel renders inoperative the amplifier circuit for allowing the return of the tools into their operative position.

4. A machine as claimed in claim 1 in which the timing means includes a second relay controlled by the amplifier, an armature therefor, a rotary cam adapted to be released by the attraction of the armature by the second relay, a plate constantly rotating under the action of the machine engine and adapted to frictionally drive the cam and means whereby the cam after a predetermined angular travel provides for the breaking of the amplifier circuit.

5. A machine as claimed in claim 1 in which the timing means includes a second relay controlled by the amplifier an armature therefor, a rotary cam adapted to be released by the attraction of the armature by the second relay, a plate constantly rotating under the action of the machine engine and adapted to frictionally drive the cam and a switch in the amplifier circuit adapted to be opened by the cam after a predetermined angular rotation of said cam.

6. A machine as claimed in claim 1 in which the timing means includes a second relay controlled by the amplifier, an armature therefor, a rotary cam adapted to be released by the attraction of the armature by the second relay, a plate constantly rotating under the action of the machine engine and adapted to frictionally drive the cam, a switch in the amplifier circuit adapted to be opened by the cam after a predetermined rotation of said cam and means for angularly shifting the last mentioned switch with reference to the cam.

7. An automatically controlled plant thinning and cultivating machine for digging se'ectively parts of a row of plants comprising a feeler of electrical conducting material adapted to engage the plants of a row, a source of electricity, an electric circuit connected to said source and to said feeler and adapted to be closed by the grounding of the feeler through a plant, an amplifier connected to said circuit and including a thyratron, the grid of which is connected with the feeler, a direct current source feeding the anode circuit thereof, a relay controlled by said amplifier, digging tools adapted to be moved into inoperative position by said relay when energized and timing means for automatically deenergizing during a predetermined time said relay after the circuit has been closed over a plant to be protected against the action of the tools and including a high frequency oscillating circuit in series with the thyratron anode adapted to transform the direct current feed into a pulsatory voltage for interrupting the discharge in the thyratron when the pulsatory voltage passes through zero immediately after the grid biasing produced by the grounding of the feeler circuit is cut out.

8. A machine as claimed in claim 7 in which the timing means includes a second relay controlled by the amplifier, an armature therefor, a rotary cam adapted to be released by the attraction of the armature by the second relay, means driving the cam and means whereby the cam after a predetermined angular travel renders inoperative the amplifier circuit for allowing the return of the tools into their operative position and switches controlling respectively the operativeness of the second relay and of the oscillating circuit.

9. A machine as claimed in claim 1 in which the timing means comprises a second relay controlled by the amplifier for breaking the amplifier circuit and adjustable means for delaying to the desired extent the energization and de-energization of said second relay.

10. A machine as claimed in claim 1, in which the timing means comprises a second relay controlled by the amplifier for breaking the amplifier circuit, adjustable means for delaying to the desired extent the energization and de-energization of said second relay, a capacity inserted in parallel with the first relay for forming a circuit the oscillations of which are adapted to allow the return to starting conditions of the amplifier when the feeler is no longer grounded and switches controlling the operation respectively of the second relay and of the oscillating circuit.

11. A machine as claimed in claim 1, in which the timing means comprises a second relay fed by the amplifier for breaking the amplifier circuit and a condenser connected in parallel with said second relay, whereby the energization and de-energization of said second relay are delayed as a function of the capacity of the said condenser.

FRANÇOIS BONCOMPAIN.

REFERENCES CITED

The following references are of record in the file of this patent:

UNITED STATES PATENTS

| Number | Name | Date |
| --- | --- | --- |
| 565,671 | Cummings | Aug. 11, 1896 |
| 886,179 | Bragunier et al. | Apr. 28, 1908 |
| 1,519,198 | Franke | Dec. 16, 1924 |
| 2,007,383 | Opp | July 9, 1935 |
| 2,177,803 | Ferte et al. | Oct. 31, 1939 |